| United States Patent [19] | [11] Patent Number: 4,541,864 |
|---|---|
| Ratschat | [45] Date of Patent: Sep. 17, 1985 |

[54] METHOD AND APPARATUS FOR RECOVERY AND RECYCLING OF HEAT FROM HOT GASES

[75] Inventor: Günter Ratschat, Duisburg, Fed. Rep. of Germany

[73] Assignee: Mannesmann Demag AG, Duisburg, Fed. Rep. of Germany

[21] Appl. No.: 546,870

[22] Filed: Oct. 31, 1983

Related U.S. Application Data

[62] Division of Ser. No. 200,002, Oct. 23, 1980, Pat. No. 4,434,004.

[30] Foreign Application Priority Data

Dec. 22, 1979 [DE] Fed. Rep. of Germany ....... 2952216

[51] Int. Cl.⁴ ............................................. C21B 5/00
[52] U.S. Cl. ......................................... 75/41; 55/75; 55/179; 165/47; 266/155
[58] Field of Search ................... 165/47 H, 104.14; 75/41; 266/155; 55/75, 179, 196

[56] References Cited

U.S. PATENT DOCUMENTS

| 2,434,419 | 1/1948 | Laughlin et al. | 55/179 |
| 4,252,772 | 2/1981 | Way | 165/47 |
| 4,326,344 | 4/1982 | Smith | 165/47 |

FOREIGN PATENT DOCUMENTS 572677 10/1945 United Kingdom ................. 55/179

*Primary Examiner*—Albert W. Davis, Jr.
*Attorney, Agent, or Firm*—Mandeville and Schweitzer

[57] ABSTRACT

The present invention relates to a method and an apparatus for the recovery and recycling of heat from hot exhaust gases, specifically from exhaust gases in metallurgical processes and from warm gases having an exiting temperature of below about 800° C. According to the preferred embodiment of the present invention, warm or hot exhaust fuel gases transfer their retained heat to the lower portions of vertically positioned, capillary-type action heat transfer pipes. Cold air is then directed past the upper portion of the heat pipes, thereby transferring the heat of the heat transfer pipes to the cold air. The now heated air gains further heat, prior to introduction into the blast furnace, by passing over, previously heated refractory gratings.

1 Claim, 2 Drawing Figures

METHOD AND APPARATUS FOR RECOVERY AND RECYCLING OF HEAT FROM HOT GASES

This is a division of application Ser. No. 200,002, filed Oct. 23, 1980, now U.S. Pat. No. 4,434,004, granted Feb. 28, 1984.

BACKGROUND OF THE INVENTION

The method and apparatus disclosed in the prior art are aimed at decreasing energy consumption by the recapture of heretofore unused heat from metallurgical processing gases and exploitation of the retained heat to preheat the fuel gases used in combustion processes, resulting in the conservation of energy and fuel. In the metallurgical field, efforts to conserve heat energy have been principally directed toward decreasing amounts necessary for processing using coke gas, natural gas, blast-furnace gas, heating oil, etc. Another purpose sought to be accomplished by such conservation methods is the utilization of the heat of exhaust gases of metallurgical processes to support the production of high temperatures for the extraction of metal. More specifically, in the production of crude iron and steel it is possible and highly desirable to increase the economy of the metallurgical processes by using higher input temperatures of the processing gases.

The energy expenditure in ore reduction is considerable; the blast furnace itself uses about 66% of the total energy of a metallurgical plant for the production of crude iron. Approximately 3000 $Nm^3$ of air are required for the burning of one ton of coke. In order to conserve fuel, in this example, coke, the present invention contemplates that the air is heated in air heaters to a maximum temperature of about 1300° C. Processing gas escaping from the metallurgical furnace is recaptured and utilized, with the addition of coke gas, for heating the air. The coke gas is burned in the air heater and subsequently flows through refractory stones, in the shape of gratings. Thus, the interior of the air heater is heated to a maximum temperature of about 1550° C. The exhaust gas flowing out of the air heater still, however, possesses a temperature of approximately 250° C. The exhaust gas of the prior art, still having a considerable heat content, nevertheless leaves the installation through a chimney and flows into the open atmosphere. The prior art teaches that, subsequent to the heating period of the grates, the gas burner of the air heater is switched off, and cold air, produced in blast machines under high pressure, is blown through the hot masonry grating of the air heater. The hot stones release a large portion of their heat into the air which is then blown into the blast furnace through the conventional hot air ring line and blast tuyeres. In the conventional set-up, at least two air heaters are at work at any given time, alternating between heating period and air period to thereby improve the blast capacity.

It is known (Iron and Steel Engineer, August 1979, page 14), that conservation in heat energy is achieved through the use of improved heat exchangers. To this end, it has been proposed to use rotating plate/pipe heat exchangers whose thermo-heat transfer efficiency is presumed higher than that of pipe recuperators. Such heat exchangers have already been employed for preheating the air for the air heaters of blast furnaces. The savings in heat, through the employment of heated air instead of the customary cold air in the air heater, amounts to about 25,000 kcal/t crude iron. With a heating value of the coke furnace gas of approximately 4000 kcal/Nm3, this conservation in heat leads to approximate savings of 6 $Nm^3$ of coke gas per ton of crude iron. While this results in heat energy savings, it is still relatively negligible and accordingly needs to be improved. A further disadvantage of prior art methods and apparatus which use the rotating plate/pipe heat exchangers is that they are exposed to a great deal of erosion at their rotating parts and, therefore, must be periodically replaced when they become worn.

The object of the present invention is to increase the thermal economy and efficiency in the recovery and recycling of heat from hot gases, particularly from metallurgical exhaust gases. A method and apparatus to attain the desired economy and efficiency is an object of the invention disclosed herein. Thermal economy and efficiency is achieved by the present invention by conducting the exhaust gases through gaps located between a plurality of heat pipes which are arranged so as to be separated by spaces and closed on both ends. Subsequently, the exhaust gases are released into the open and fresh cold air, passing by the just heated heat pipes receive the heat energy stored in the heat pipes. Alternatively, cold fuel gases introduced into the gaps, heated to below the range of ultimately desired gas-heat temperature, are fed into a combustion and/or metallurgical process. Preheating of the combustion air, necessarily introduced into the combustion process, results in significant economic advantages for the process. These advantages have an effect, for example, inside the blast furnace and the hot-blast cupola furnace and bring about, inter alia, considerable savings in fuel, specifically of metallurgical coke. The method, according to the present invention, works advantageously with a heat transfer efficiency of greater than 75%.

Additionally, it is especially advantageous to apply the method, according to the present invention, to the blast furnace air-heater method, in which at certain times, at periodic predetermined intervals, air, preheated through the heat pipes, is conducted into the combustion chamber, and burned gases, which initially heat the masonry grating, are subsequently conducted between the heat pipes. The preheating of the air for the air heater, i.e., the introduction of hot air instead of cold air into the air heater during the heating-up period, has heretofore been neglected because the technical relationships were not appreciated. Experts were dissuaded in particular from utilizing the exhaust heat of the air heater for the preheating of the combustion air because the temperature level of the air-heater exhaust gases were considered too low. Now, however, the present invention uses the retained heat of the exhaust gases, albeit low, for heating fresh cold air. Furthermore, the relative low efficiency of the heat transfer of gas recuperators prevented the exploitation of exhaust-gas heat on economical grounds.

It is also advantageous to apply the method of the present invention to the regeneration of zeolitic molecular screening substances, such that the air conducted between the heat pipes is heated to a temperature of between about 200° to 300° C. and subsequently conducted through the molecular screening bed to absorb nitrogen, carbon dioxide and water vapors.

Yet another advantageous feature for practicing the described method is proposed. To this end, it is provided that the heat pipes, arranged in the form of rows or gratings, are combined into a heat exchanger and surrounded with a heat-exchanger casing, whereby the longitudinal axes of the heat pipes extend at right angles to the direction of the flow of cold air or, if applicable, to the direction of the flow of the fuel gas or exhaust gas. Additionally, each longitudinal section of the heat pipes can be surrounded by separate chambers stacked one upon the other. If the latter construction is used then the space-saving arrangement of the heated portions of the pipes with respect to the cooled portions of the heat pipes is especially advantageous. It is an advantage of the present apparatus that the heat-releasing or, if applicable, heat-receiving gas flows in a horizontal direction. This results in corresponding flow cross sections without the necessity for a large re-routing section.

Still a further advantage of the present inventive apparatus lies in the arrangement of the heat pipes in the shape of rows or, if applicable, gratings; i.e., they are connected to one another through rod or lamella-shaped supports. In this case, the supports, made from metals or non-metals, can serve also as heat carriers.

The thermodynamic efficiency of the apparatus, according to the present invention, may also be increased by insulating the separate chambers of the heat exchanger with thermal insulation materials.

Exemplary embodiments of the present invention are illustrated in the drawings and described in more detail below. The inventive method, according to the present invention, is also described below and best understood with the aid of the drawings.

DETAILED DESCRIPTION OF THE DRAWINGS

Figure 1:
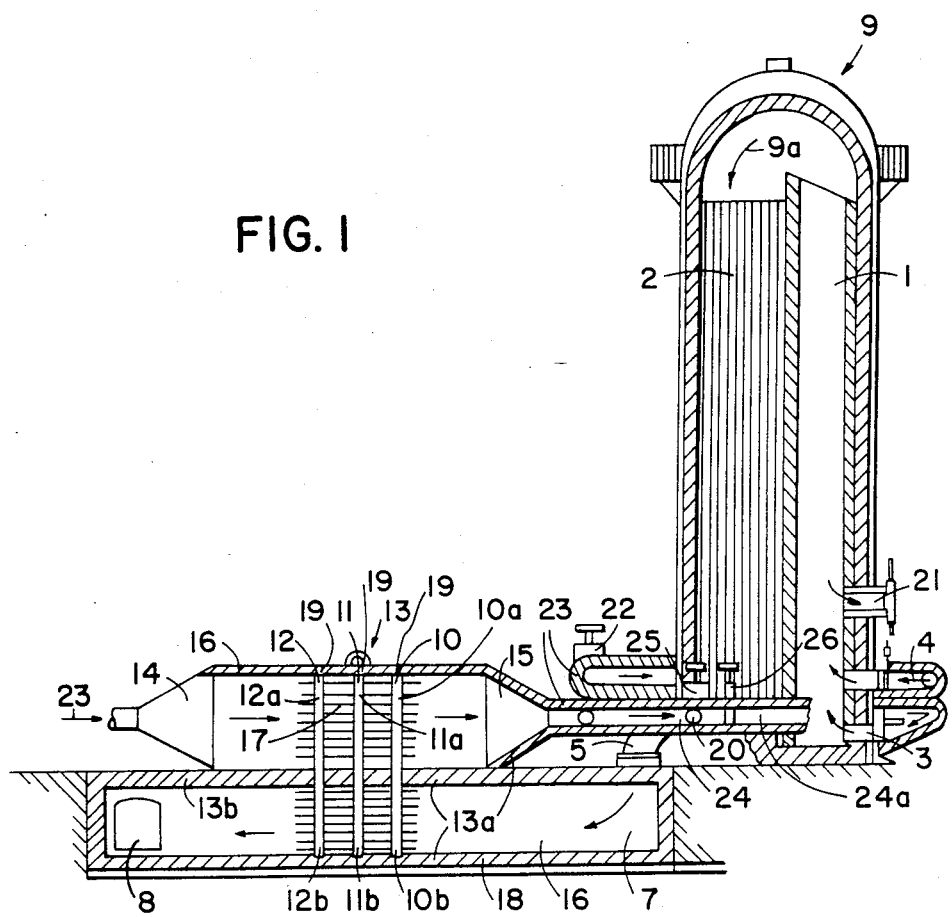
FIG. 1 is a vertical cross sectional view of a blast furnace air-heater installation, showing the present invention, in the preferred embodiment.

In the illustrated blast furnace air-heater installation according to FIG. 1, a gas mixture comprised of blast furnace gas and coke furnace gas, enters the combustion chamber 1 during the heating-up phase, and thereby arrives in the refractory gratings 2. The gas mixture is introduced into the combustion chamber 1 by passing through the entrance opening 3 and combines with the preheated combustion air flowing in through a separate entrance opening 4. At that point, the gases are ignited and burned. The resulting hot fuel gases rise in the combustion chamber 1, flow into the dome 9, are redirected as illustrated by arrow 9a, and flow downwardly through the refractory gratings 2, whereupon a portion of the associated heat is transferred to gratings 2. Thus, the gratings 2 heat up to the desired temperature of approximately 1550° C. After transferring a large portion of their heat content, the fuel gases escape through the exhaust discharge conduit 5, into the exhaust flue 7, and from there ordinarily would flow into the open, with the remaining heat content, through the chimney intake 8 where the heat would obviously be lost. At this point, the exhaust gases, in the area of the exhaust discharge conduit 5 are at a temperature of approximately 250° C.

The present invention, however, provides heat pipes 10, 11, 12, arranged in a formation of rows or, if desired, as gratings which are conducted into the exhaust flue 7 and form the heat exchange unit 13. Each individual heat pipe 10, 11, 12 is closed, i.e., the pipe ends are provided with tightly fitted covers. In addition, each pipe has a capillary-like structure at its inner cylindrical wall. Furthermore, the heat pipes are partially filled with a relatively volatile substance having a phase changing temperature range of between about 100° to 800° C. or, if desired, at even higher temperatures. The volatile substances could be, for example, liquid metals or organic substances at normal temperatures. These substances are especially suitable for the conducting of heat by evaporation and condensation. Freons or methanes are, for example, suitable organic evaporating substances which can be contained in the pipes.

Heat pipes 10, 11, 12 may be charged on all sides with a hot or, if applicable, warm air or gas flow, in the preferred embodiment, exhaust gases, such that the volatile substances located in the pipes interior evaporates thereby causing the heat pipes to act as heat storage devices. If, subsequently, there is a shift to a cold air or gas flow, in the opposite or same direction, the heat pipes would then transfer their stored heat to the now passing cold air or gas flow, at which time the gaseous or, if applicable, vaporous substance in the interior of the pipes would recondense to the appropriate liquid or to a composition corresponding to the volatile substance at low temperature.

The upper longitudinal sections 10a, 11a, 12a of the heat pipes are best seen in FIG. 1 as being located in the cold air canal 14, which constitutes a part of the heat-exchanger casing 13a. At the same time, the cold air canal 14 defines in its interior a separate chamber 15. In the same manner, the exhaust gas flue 7, in which the lower longitudinal sections 10b, 11b, 12b of the heat pipes are located, also forms a separate chamber 16. The heat pipes 10, 11, 12 or a group or several groups or a plurality of such heat pipes are mounted in the wall 13b of the heat exchanger casing 13a, or alternatively, they are connected to each other by means of rod, pipe or lamella-shaped supports 17. To enhance the heat storing and transferring effect of the heat exchanger, the lamella-shaped supports can be constructed of heat conducting material, e.g., a highly conductive metal. Effects of the external temperature on the separate chambers 15 and 16 are to be avoided. The wall 13b is, therefore, insulated with thermal insulation materials 18 as are the other exterior walls, as desired.

In the illustrated exemplary embodiment, the longitudinal axes 19 of the heat pipes 10, 11, 12 lie in a single vertical plane and are parallel to one another. Other configurations are possible for the heat pipes so long as the counter-current principle of heat transfer is retained. Furthermore, the heat pipes 10, 11, 12, together with the supports 17, form an independent, separately insertable structure unit, which can easily be removed and replaced by an overhead crane if and when cleaning is required because of dust particles settling on the lamellas, supports, pipes. etc.

During the heating-up period of the air heater, the heat pipes 10, 11, 12 are heated up, as previously described, with the retained heat of the fuel gases. In the subsequent air blast period of the air heater, cold air is blown through the opening 20 of the air heater, heating up to a temperature of approximately 1300° C. by passing by the hot grating 2, and then flows through the exit opening 21 into the blast furnace (not illustrated). Instead of this cold air influx through the opening 20, with valve 22 open, preheated cold air, i.e., air heated by passing by heat exchanger 13 may now flow into the opening 20 in direction of arrow 23, through the pipe line 24, so that the rise in temperature to the mentioned 1550° C. of the air flowing out of exit opening 21 may occur with, however, a corresponding decrease in the quantity of fuel gas required.

An additional quantity of fuel gas may also be saved during the preheating of grating 2. This can be accomplished by preheating the fuel gas and feeding it through the pipe line 24a into the entrance opening 3 instead of cold air in the direction of arrows 23, with valve 25 closed and valves 22, and 26 open. To this desired end, it is not necessary that heat storage in the heat exchanger first occur in the heat pipes 10, 11, 12 from the hot exhaust gases which flow through the exhaust flue 7. The heat need, therefore, not necessarily be drawn from the air heater but, rather, may be provided from a second air heater from other areas of the smelting plant providing preheated air.

Figure 2:
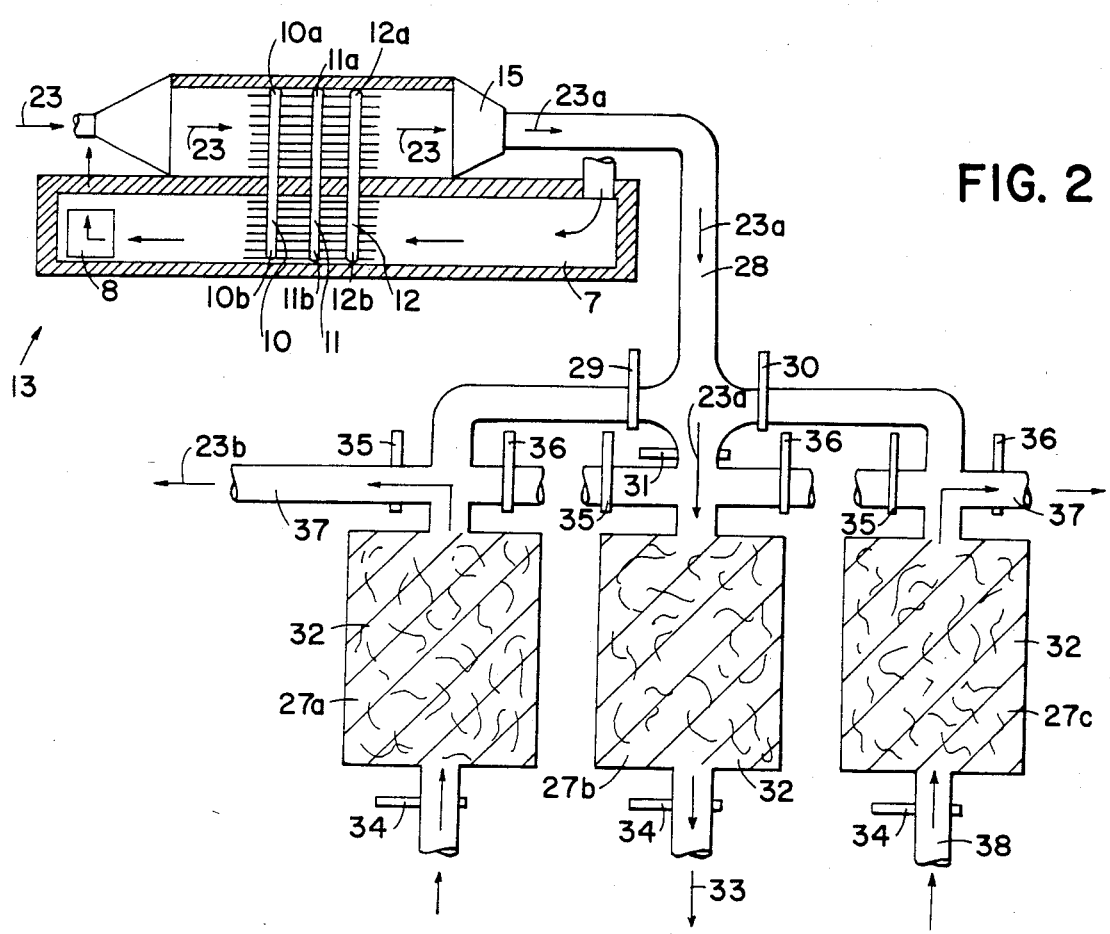
FIG. 2 is a cross sectional view taken through a vessel and heat exchanger for molecular screening substances in which air is enriched with oxygen by removal of certain air entrained particles. This is a second embodiment of applying the present invention.

As best seen in FIG. 2, a heat exchanger 13 similar to the one previously described is also arranged for use with vessels 27a, 27b, 27c which contain molecular screening substances. The molecular screening substances serve to enrich, with oxygen, the added cold air and to dehumidify it. Air enriched with oxygen, which is also preheated and dehumidified, also serves to lower the energy requirements in the air heater and/or in the blast furnace. In addition, a more intensive regeneration of the molecular screening substances, saturated with nitrogen and humidity, occurs in the molecular screening vessels 27a, 27b, 27c because of adding preheated air or, if applicable, preheated gases.

As described above with respect to the embodiment shown in FIG. 1, and now with reference to FIG. 2, a hot or warm gas (drawn possibly from a blast furnace air heater installation) flows through exhaust flue 7, and releases a portion of its heat to the heat pipes 10, 11, 12 located in the longitudinal sections 10b, 11b, 12b. The air or gas then leaves through the chimney intake 8 with a temperature only slightly above the required temperature to produce the speed in the chimney for the exiting exhaust gas. Cold fresh air, possibly originating from a blast machine (not illustrated) enters the chamber 15 and is heated by the heat pipes in the longitudinal sections 10a, 11a, 12a and flows as warm air 23a through the feed line 28 to the molecular screening vessels 27a, 27b, 27c.

With valves 29 and 30 closed, and valve 31 open, warm air 23a flows into vessel 27b therein causing a regeneration of the molecular screening substance 32, whereby desorbed exhaust gases 33 (nitrogen, carbon dioxide, humidity) flow into the atmosphere, through open valve 34. The molecular screening substance 32 of the vessel 27b is now ready to enrich the air with oxygen by the absorption of nitrogen, carbon dioxide and water vapor from the air. The air so enriched with oxygen is then fed into other metallurgical processes.

The above described regenerating procedure for molecular screening substance 32 in vessel 27b is also carried out, periodically and alternatingly in vessels 27a and 27c. Subsequent to the conclusion of each process phase, warm air 23a, or cold air (from a blast machine, not illustrated) is in counter current. This is done with valves 34 open, through the zeolitic molecular screening substances 32, which effects the oxygen enrichment. The air 23b, enriched with oxygen, acquired in this manner, flows, with valve 35 open and valve 36 closed, through the pipe line 37 into the air-blast line, through the nozzles and into the blast furnace.

During the processing phases, i.e. "regeneration" in vessel 27b and "oxygen enrichment" (absorption period) in vessel 27a, the molecular screening substances 32 located in vessel 27c, are cooling off. At that time, cold fresh air flows from the blast machine, with valve 34 open, through the pipe line 38 and through vessel 27c. The gases flow as warm gas into the heat exchanger 13 (illustrated in FIG. 1) through pipe line 37, at an exhaust air temperature of above 100° C. with valve 36 open and valve 35 closed. During this period, the zeolitic molecular screening substances 32 of vessel 27c cools off. The exhaust air is conducted into the atmosphere at a correspondingly low temperature such that no additional heat may be extracted and removed.

According to the above described second exemplary embodiment of the present invention, the heat exchanger 13 serves alternatingly to control the molecular screening substances 32 and the reduction process in the blast furnace, as well as further metallurgical processes such as, for example, steel production processes, preheating of reaction gases for the steel production process in bottom-blown converters or, if applicable, nozzle-blown steel mill converters.

It should be clearly understood that the above described embodiments of the present invention are meant to be illustrative of the invention. Accordingly, reference should be made to the following appended claims and equivalents thereof in determining the scope of the invention.

I claim:

1. A method for regenerating the molecular screening materials in a blast furnace metallurgical operation, comprising the steps of:

(a) providing a blast furnace metallurgical operation;

(b) directing the fully combusted exhaust gases from said blast furnace metallurgical operation to a heat exchanger means;

(c) transferring a portion of the heat of said fully combusted exhaust gases to said heat exchanger means;

(d) venting, to the atmosphere, said fully combusted exhaust gases;

(e) conducting fresh, atmospheric air to and through said heat exchanger means;

(f) transferring to said fresh, atmospheric air, at least a portion of said heat previously transferred to said heat exchanger means;

(g) further conducting said now-heated fresh, atmospheric air away from said heat exchanger means; and (h) passing said now-heated fresh, atmospheric air to and through molecular screening materials to thereby regenerate said screening materials for further use in providing oxygen-enriched and dehumidified air to said blast furnace metallurgical operation.

* * * * *